United States Patent [19]
Ueno et al.

[11] Patent Number: 5,965,715
[45] Date of Patent: Oct. 12, 1999

[54] BISAZO COMPOUNDS AND PROCESS FOR THE PREPARATION THEREOF

[75] Inventors: Ryuzo Ueno, Nishinomiya; Masaya Kitayama, Takarazuka; Kenji Minami, Sennan; Hiroyuki Wakamori, Hikami-gun, all of Japan

[73] Assignee: Kabushiki Kaisha Ueno Seiyaku Oyo Kenkyujo, Osaka, Japan

[21] Appl. No.: 09/091,558

[22] PCT Filed: Oct. 17, 1997

[86] PCT No.: PCT/JP97/03760

§ 371 Date: Jun. 22, 1998

§ 102(e) Date: Jun. 22, 1998

[87] PCT Pub. No.: WO98/17728

PCT Pub. Date: Apr. 30, 1998

[30] Foreign Application Priority Data

Oct. 23, 1996 [JP] Japan ................................... 8-280643

[51] Int. Cl.$^6$ ........................ C09B 35/023; C09B 35/033; C09D 11/00; C08J 3/20
[52] U.S. Cl. ...................... 534/658; 534/689; 534/763; 534/797; 534/812; 534/819; 534/813; 534/DIG. 4; 106/31.81; 106/496; 430/72; 524/190
[58] Field of Search .................... 534/658, 689, 534/763, 797, 812, 819, 813, DIG. 4; 106/31.81; 430/72; 524/190

[56] References Cited

U.S. PATENT DOCUMENTS

| | | | |
|---|---|---|---|
| 3,877,957 | 4/1975 | Bradley et al. | 106/31.81 X |
| 4,663,442 | 5/1987 | Ohta | 534/797 X |
| 4,737,430 | 4/1988 | Kinoshita et al. | 430/59 |
| 5,459,247 | 10/1995 | Hashimoto | 534/658 |

FOREIGN PATENT DOCUMENTS

| | | |
|---|---|---|
| 57-144577 | 9/1982 | Japan. |
| 57-176056 | 10/1982 | Japan. |
| 5-32905 | 2/1993 | Japan. |
| 5-333570 | 12/1993 | Japan. |
| 6-41451 | 2/1994 | Japan. |

OTHER PUBLICATIONS

Hasegawa et al., Chemical Abstracts, 107:68100 (1987).

*Primary Examiner*—Fiona T. Powers
*Attorney, Agent, or Firm*—Sughrue, Mion, Zinn, Macpeak & Seas, PLLC

[57] ABSTRACT

The invention provides novel bisazo compounds which is obtained by coupling two molecules of a 2-hydroxynaphthalene-3,6-dicarboxylic acid derivative and a compound having two diazo groups in its molecule, as well as a process for producing the same. The present compounds are superior in resistance to water, chemical agents, solvents, heat and the like.

9 Claims, 4 Drawing Sheets

BISAZO COMPOUNDS AND PROCESS FOR THE PREPARATION THEREOF

TECHNICAL FIELD

The present invention relates to a novel bisazo compound and a process for producing the same.

BACKGROUND OF THE ART

Azo compounds are useful as dyes, pigments, carrier generation materials and the like, and a large number of such compounds have been provided for many years. Particularly in recent years, many compound suitable for OPC have been developed. For example, a highly sensitive and highly durable carrier generation material which uses a hydroxynaphthalenedicarboxyimide as a coupler has been proposed in Japanese Patent Publication No. 95-234530 A. The imide proposed in this Patent Publication is 2-hydroxynaphthalene-4,5-dicarboxyimide.

DISCLOSURE OF THE INVENTION

The feature of the present invention is to provide a bisazo-coloring material which is superior in resistance to water, chemical agents, solvents, heat and the like.

The present invention provides a novel bisazo compound each of which has two azo groups in its molecule and which uses a 2-hydroxynaphthalene-3,6-dicarboxylic acid, ester, amide, or ureide derivative as a coupler, as well as a coloring matirial comprising the same, and a method for producing said bisazo compounds. Thus, the present invention provides a bisazo compound represented by the following general formula [I]:

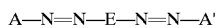

[wherein, A and A' may be the same or different, and represent the following general formula [II]:

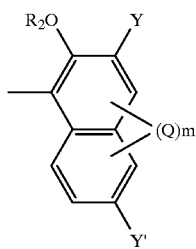

(wherein,

Y is —(CONH)n—X or —COR,

Y' is —(CONH)n—X' or —COR', and

X and X' may be the same or different, and represent an optionally substituted aromatic group or an optionally substituted heterocyclic group having a conjugated double bond), n represents an integer of 1 or 2, R and R' may be the same or different, and represent a hydroxy group, an optionally branched alkoxy group having 1–6 carbon atoms, a benzyloxy group, a phenoxy group, or a phenacyloxy group, $R_2$ represents a hydrogen atom, an optionally branched alkyl group having 1–6 carbon atoms, an acyl group having 1–6 carbon atoms or a phenylalkyl group;

Q represents an optionally branched alkyl group having 1–6 carbon atoms, an optionally branched alkoxy group having 1–6 carbon atoms, a halogen atom, a nitro group or a nitroso group, and m represents an integer from 0 to 3, and when one of R and R' represents a hydroxy group, it may optionally form an acceptable salt;

E represents a cyclic group having a conjugated double bond], as well as a coloring material comprising said bisazo compound. In this specification, the term "coloring material" refers to dyes, pigments, inks, paints, printing inks, carrier generation materials and the like.

The present invention further relates to a process for producing said bisazo compound in which process a compound represented by the general formula [VI]:

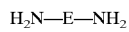

[wherein, E represents a cyclic group having a conjugated double bond] is diazotized, and the bisdiazonium compound so obtained is coupled with a compound represented by the general formula [VII]:

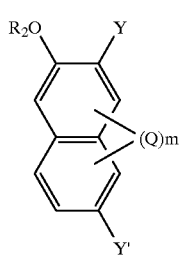

[wherein,

Y is —(CONH)n—X or —COR,

Y' is —(CONH)n—X' or —COR',

X and X' may be the same or different, and represent an optionally substituted aromatic group or an optionally substituted heterocyclic group having a conjugated double bond, R and R' may be the same or different, and represent a hydroxy group, an optionally branched alkoxy group having 1–6 carbon atoms, a benzyloxy group, a phenoxy group, or a phenacyloxy group, n represents an integer of 1 or 2, $R_2$ represents a hydrogen atom, an optionally branched alkyl group having 1–6 carbon atoms, an acyl group having 1–6 carbon atoms or a phenylalkyl group;

Q represents an optionally branched alkyl group having 1–6 carbon atoms, an optionally branched alkoxy group having 1–6 carbon atoms, a halogen atom, a nitro group or a nitroso group, and m represents an integer from 0 to 3].

Furthermore, this bisazo compound may optionally be formed a lake by using a metal compound, when at least one of R and R' is a hydroxy group.

As described above, a coupler in the invention (a group represented by the general formula [II] or a compound represented by [VII]) is prepared from 2-hydroxynaphthalene-3,6-dicarboxamide, carbonylurea or carboxylic acid derivative as a raw material. The raw material, 2-hydroxynaphthalene-3,6-dicarboxylic acid may be obtained by the Kolbe-Schmitt method of reacting carbon dioxide with potassium 2-naphtholate under a high pressure and at a high temperature in the presence of a potassium salt such as potassium naphthol.

The amide or ureide may be obtained by preparing an acid chloride according to a conventional method, for example, using thionyl chloride in a solvent such as sulfolane, and by reacting it with amines or ureas. Alternatively, the same may also be obtained by directly reacting with amines or ureas using phosphorous trichloride or dicyclohexylcarbodiimide.

Examples of the amines or ureas, that is, a compound which constitutes X or X' in Y and Y', include an optionally substituted aromatic amino compound such as aniline (X or X' is a phenyl group), α- or β-aminonaphthalene (X or X' is a naphthyl group), or aminoanthraquinone (X or X' is an anthraquinonyl group), and an optionally substituted heterocyclic compound having a conjugated double bond such as aminobenzimidazolone (X or X' is a benzimidazolonyl group), aminocarbazole (X or X' is a carbazolyl group), aminopyridine (X or X' is a pyridyl group), aminothiazole (X or X' is a thiazolyl group), aminobenzothiazole (X or X' is a benzothiazolyl group), or aminoimidazole (X or X' is an imidazolyl group) as well as aminoindole (X or X' is an indolyl group), aminothiophene (X or X' is a thiofuryl group), aminophenothiazine (X or X' is a phenothiazinyl group), aminoacridine (X or X' is an acridinyl group), and aminoquinoline (X or X' is a quinolinyl group). Examples of substituents on these compounds are a halogen atom, a nitro group, a lower alkyl group, a cyano group, a phenoxy group, an amide group (for example, a phenylaminocarbonyl group) and the like, and these phenyl and amide groups may also have another substituent such as a halogen atom, a lower alkyl, lower alkoxy, alkylaminosulfonyl, nitrile group or the like.

The amino compound described above may be reacted with potassium cyanate to obtain a corresponding urea. Thus, for example, phenylurea may be obtained from aniline.

Y and Y' may also represent —COR or —COR'. R and R' may be the same or different, and represent a hydroxy group, an optionally branched alkoxy group having 1–6, preferably 1–4 carbon atoms, in particular, a methoxy group or an ethoxy group; or a benzyloxy, phenoxy or phenacyloxy group. An aromatic ring contained in these groups may optionally be substituted by, for example, a halogen atom, a lower alkyl group or the like.

The group $R_2$ is a hydrogen atom, an optionally branched alkyl group having 1–6, preferably 1–4, carbon atoms, in particular, a methyl group or an ethyl group; an acyl group having 1–6, preferably 1–4 carbon atoms, in particular, an acetyl group; or a phenylalkyl group. The phenylalkyl group may optionally be substituted by a halogen atom, a lower alkyl group or the like.

The group Q means that the naphthalene nucleus may optionally be substituted, and examples of Q are an optionally branched alkyl group having 1–6, preferably 1–4 carbon atoms, in particular, a methyl group or an ethyl group; an optionally branched alkoxy group having 1–6, preferably 1–4 carbon atoms, in particular, a methoxy group or an ethoxy group; and a halogen atom, a nitro group, or a nitroso group. Although the number of the substituent m is typically 0, it may be 3 or less. Provided that there is no case of having a substituent at the 1-position of the naphthalene nucleus.

The bisazo compound of the present invention may be obtained by diazotizing a diamine compound represented by the general formula [VI] with sodium nitrite, etc., and coupling the resulting bisdiazonium compound with the above-described 2-hydroxynaphthalene-3,6-dicarboxylic acid, ester, amide or ureide.

In addition, when R or R' is a hydroxy group, the compound may optionally be formed a lake by means of an appropriate metal salt, for example, a salt of Ca, Ba, Mn, or St.

The diamine, that is, a compound which constitutes E, is a compound having two amino groups directly bonded to a cyclic group having a conjugated double bond, and the cyclic group may optionally have a substituent(s) such as a halogen atom, a lower alkyl, alkoxy, cyano, nitro, sulfo group or the like. A typical amine which may be used in preparing a bisazo compound of the invention is a diamine comprising an arylene group, or a basic skeleton represented by the general formula [III] or [V];

         [III]

[wherein, Ar and Ar' each independently represent an optionally substituted aryl or heterocyclic group having a conjugated double bond, M represents a group selected from a group consisting of a single bond, —CH$_2$—, —CH═C(E')— (in which E' is a hydrogen atom or a halogen atom, or a lower alkyl group, a cyano group or the like), —O—, —S—, —S—S—, —CO—, —COO—, —SO$_2$—, —N(T)— (in which T is an optionally substituted phenyl group or a lower alkyl group), —N═N—, —CH═CH— φ—CH═CH— in which φ is an arylene group, and a formula [IV]:

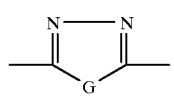         [IV]

(in which G represents —O—, —S— or —NH—)];

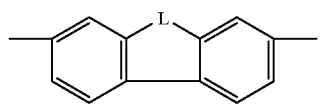         [V]

[wherein, L represents >N—CH$_3$, >C═O, or >C═S].

Specific examples of these diamines are as follows:

(1) a group of arylenediamines may include, for example, an optionally substituted phenylenediamine, naphthylenediamine, or anthrylenediamine, (2) a group of —Ar—M—Ar'— may include, for example, when M is a single bond,

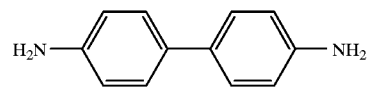

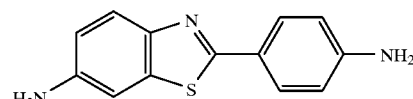

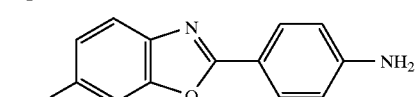

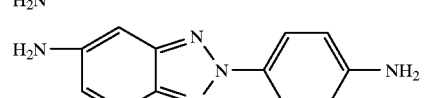

when M is —CH$_2$—,

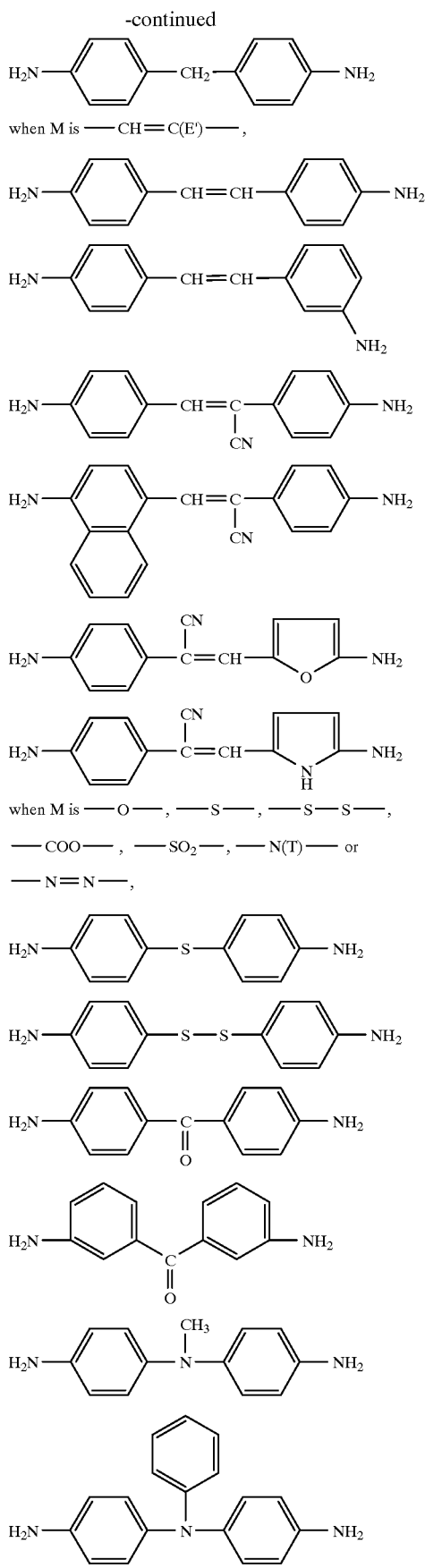

when M is —CH=C(E')—, when M is —O—, —S—, —S—S—,
—COO—, —SO$_2$—, —N(T)— or
—N=N—,

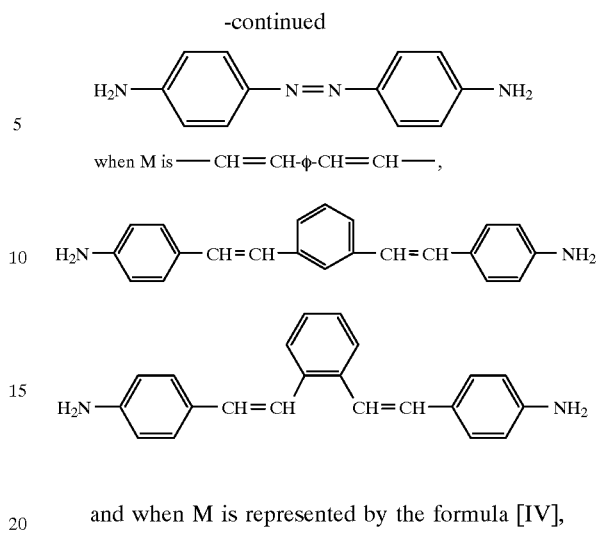

when M is —CH=CH-φ-CH=CH—, and when M is represented by the formula [IV],

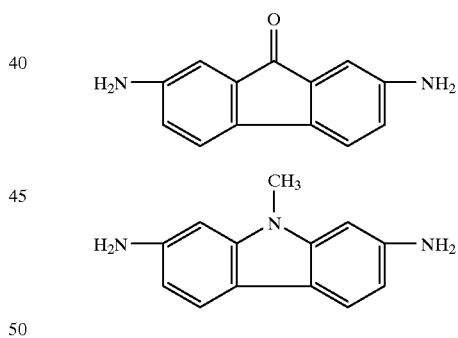

and (3) a group of those diamines having the basic skeleton work represented by the general formula [V] may include, for example, The method for obtaining a bisdiazonium compound from diamines is not especially restricted. A standard method in which an aromatic primary amine is diazotized with sodium nitrite may be used.

The process in which the bisdiazonium compound is further subjected to a coupling reaction using a 2-hydroxynaphthalene-3,6-dicarboxylic acid, ester, amide or ureide described above may also be achieved by any of conventional methods.

The bisazo compounds of the invention may be used in pigments, printing inks, paints, coloring agent for plastics, organic photoconducters and the like.

The invention will be explained by the following examples.

EXAMPLE 1

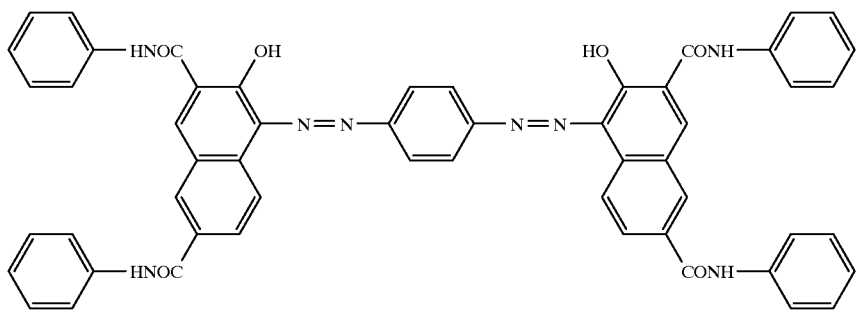

In 50 g of water, 1.08 g of 1,4-phenylenediamine was suspended, and then dissolved by adding 3.0 g of 35% hydrochloric acid. Diazotization was then conducted by adding dropwise a solution of 2.1 g of sodium nitrite dissolved in 10 g of water, while maintaining the temperature at 0° C. On the other hand, 11.5 g of 2-hydroxy-3,6-diphenylaminocarbonylnaphthalene was suspended in 230 g of N-methyl-2-pyrrolidone, dissolved by adding a solution of 1.6 g of sodium hydroxide dissolved in 10 g of water, and then maintained at 15° C. To this solution, the above diazo solution was added over about 20 minutes to conduct a coupling reaction. After stirring for additional 30 minutes, 200 g of water was added, brought to 70° C., and 800 g of water was added dropwise over about one hour. Then, the reaction mixture was gradually cooled, and filtered at room temperature with aspirating. The product was ultrasonically washed in methanol and dried under a reduced pressure to obtain 5.1 g of a dark reddish purple powder [1,4-bis(2'-hydroxy-3',6'-diphenylaminocarbonylnaphth-1'-ylazo)benzene] (melting/decomposition point: 348.0° C. (decomposition)).

An IR spectrum of this compound (KBr method) is shown in FIG. 1.

According to the same manner as descirbed in Example 1 with the exception that 13.5 g of 2-hydroxy-3,6-di(2'-chlorophenylaminocarbonyl)naphthalene was substituted for 2-hydroxy-3,6-diphenylaminocarbonylnaphthalene in Example 1, 6.3 g of a dark bluish purple powder [1,4-bis{2'-hydroxy-3',6'-di(2"-chlorophenylaminocarbonyl)naphth-1'-ylazo}benzene] was obtained (melting/decomposition point: 262.3° C. (decomposition)).

EXAMPLE 2

Synthesis of 1, 4-bis{2'-hydroxy-3', 6'-di(2"-chlorophenylaminocarbonyl) naphth-1'-ylazo}benzene

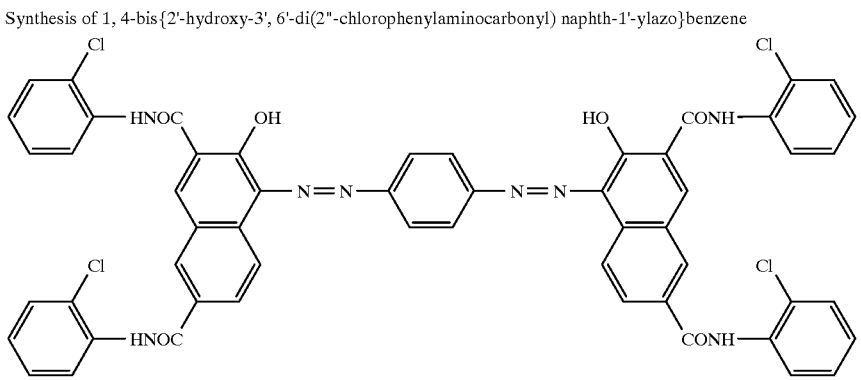

EXAMPLE 3

Synthesis of 1, 4-bis{2'-hydroxy-3', 6'-di(3"-nitrophenylaminocarbonyl)naphth-1'-ylazo}benzene

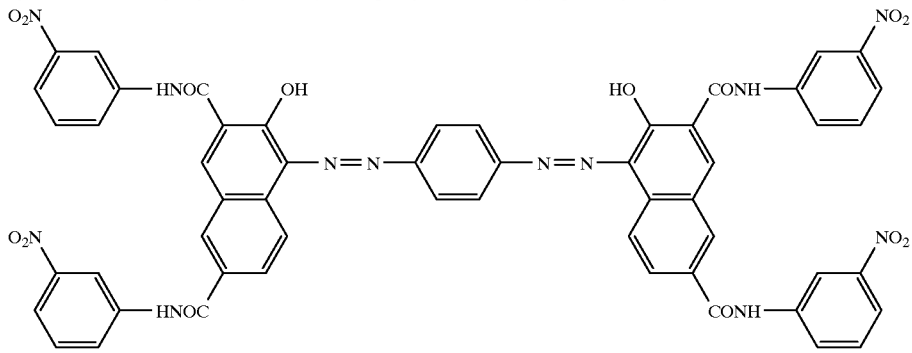

According to the same manner as described in Example 1 with the exception that 14.2 g of 2-hydroxy-3,6-di(3'-nitrophenylaminocarbonyl)naphthalene was substituted for 2-hydroxy-3,6-diphenylaminocarbonylnaphthalene in Example 1, 6.8 g of a dark bluish purple powder [1,4-bis{2'-hydroxy-3',6'-di(3"-nitrophenylaminocarbonyl)naphth-1'-ylazo}benzene] was obtained (melting/decomposition point: 283.9° C. (decomposition)).

EXAMPLE 4

Synthesis of 1, 4-bis(2'-hydroxy-3', 6'-diphenylaminocarbonylnaphth-1'-ylazo)-2-chlorobenzene

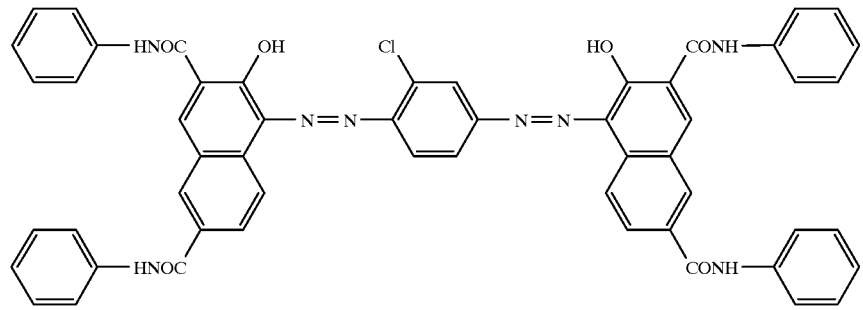

According to the same manner as described in Example 1 with the exception that 2.4 g of 2-chloro-1,4-phenylenediamine sulfate was substituted for 1,4-phenylenediamine in Example 1, 4.7 g of a deep bluish purple powder [1,4-bis(2'-hydroxy-3',6'-diphenylaminocarbonylnaphth-1'-ylazo)-2-chlorobenzene] was obtained (melting/decomposition point: 255.7° C. (decomposition)).

EXAMPLE 5

Synthesis of 1, 4-bis{2'hydroxy-3', 6'-di(2"-chlorophenylaminocarbonyl)naphth-1'-ylazo}-2-chlorobenzene

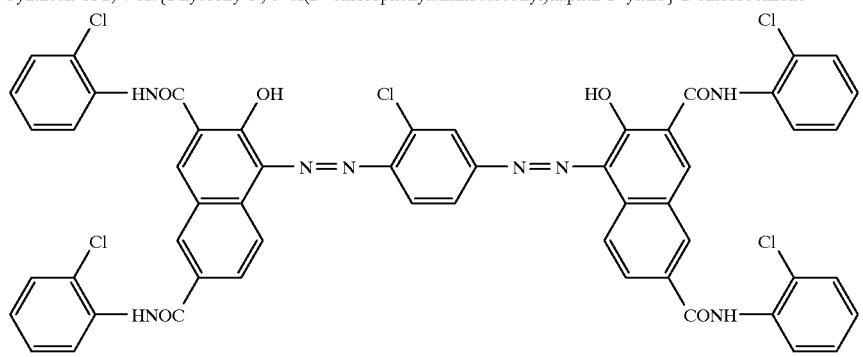

According to the same manner as described in Example 1 with the exceptions that 2.4 g of 2-chloro-1,4-phenylenediamine sulfate was substituted for 1,4-phenylenediamine in Example 1, and that 13.5 g of 2-hydroxy-3,6-di(2'-chlorophenylaminocarbonyl) naphthalene was substituted for 2-hydroxy-3,6-diphenylaminocarbonylnaphthalene, 5.4 g of a dark bluish purple powder [1,4-bis{2'-hydroxy-3',6'-di(2"-chlorophenylaminocarbonyl)naphth-1'-ylazo}-2-chlorobenzene] was obtained (melting/decomposition point: 285.0° C. (decomposition)).

A spectral property of this compound is shown in FIG. 2.

Method for Measuring Spectral Property

Measurement apparatus: Macbeth Spectrophotometer CE-7000 System (Mecbeth).

Method of measurement: a poly(vinyl chloride) molding for evaluation, obtained according to the method described in "Preparation of PVC sheet", one of the evaluation methods for bisazo compounds described in the Experiments section, was used for examination of spectral property.

It is observed that the absorption wavelength has been red-shifted to around 600–670 nm, suggesting an application of this compound to organic photoconducting materials or the like.

According to the same manner as described in Example 1 with the exceptions that 2.4 g of 2-chloro-1,4-phenylenediamine sulfate was substituted for 1,4-phenylenediamine in Example 1, and that 14.2 g of 2-hydroxy-3,6-di(3'-nitrophenylaminocarbonyl)naphthalene was substituted for 2-hydroxy-3,6-diphenylaminocarbonylnaphthalene, 6.0 g of a dark bluish purple powder [1,4-bis{2'-hydroxy-3',6'-di(3"-nitrophenylaminocarbonyl)naphth-1'-ylazo}-2-chlorobenzene] was obtained (melting/decomposition point: 292.3° C. (decomposition)).

EXAMPLE 6

Synthesis of 1, 4-bis{2'-hydroxy-3', 6'-di(3"-nitrophenylaminocarbonyl)naphth-1'-ylazo}-2-chlorobenzene

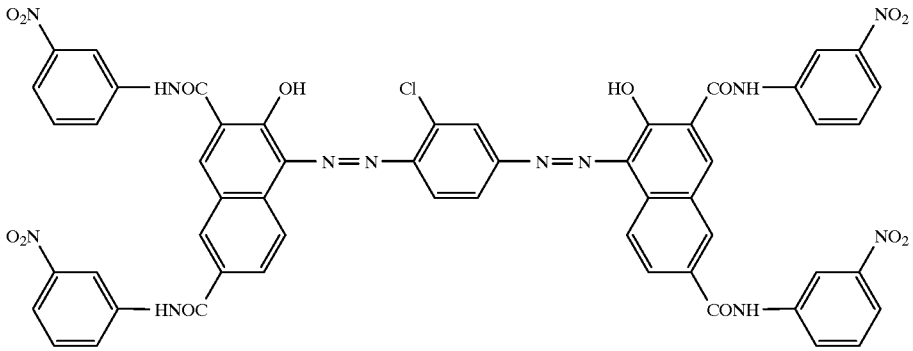

EXAMPLE 7

Synthesis of bis{4-(2'-hydroxy-3', 6'-diphenylaminocarbonylnaphth-1'-ylazo)phenyl}methane

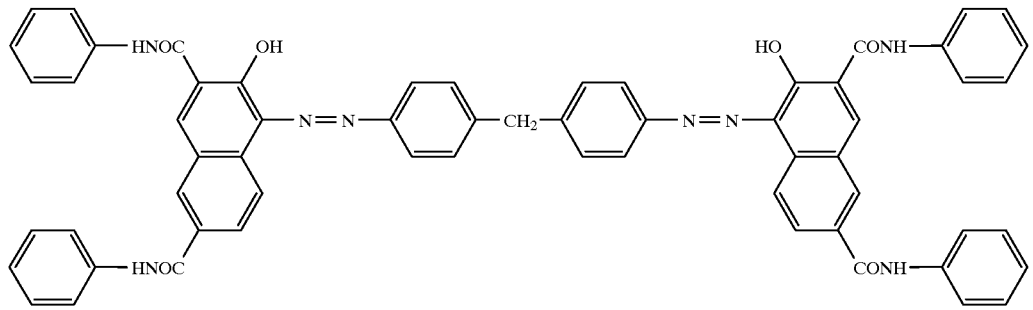

According to the same manner as described in Example 1 with the exception that 2.0 g of bis(4-aminophenyl)methane was substituted for 1,4-phenylenediamine in Example 1, 5.7 g of a dark bluish red powder [bis{4-(2'-hydroxy-3',6'-diphenylaminocarbonylnaphth-1'-ylazo)phenyl}methane] was obtained (melting/decomposition point: 204.5° C. (decomposition)).

A spectral property of this compound is shown in FIG. 3. The spectral property was measured according to the same procedure as described in Example 5. It is observed that the absorption wavelength has been red-shifted to around 580–680 nm, suggesting an application of this compound to organic photoconducting materials or the like.

EXAMPLE 8

Synthesis of bis{4-(2'-hydroxy-3', 6'-diphenylaminocarbonylnaphth-1'-ylazo)phenyl}ether

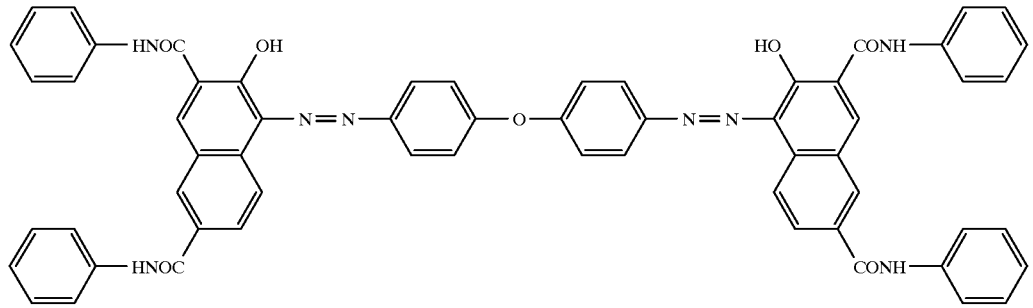

According to the same manner as described in Example 1 with the exception that 2.0 g of bis(4-aminophenyl) ether was substituted for 1,4-phenylenediamine in Example 1, 4.4 g of a dark bluish red powder [bis{4-(2'-hydroxy-3',6'-diphenylaminocarbonylnaphth-1'-ylazo)phenyl}ether] was obtained (melting/decomposition point: 297.5° C. (decomposition)).

EXAMPLE 9

Synthesis of bis{4-(2'-hydroxy-3', 6'-diphenylaminocarbonylnaphth-1'-ylazo)phenyl}sulfone

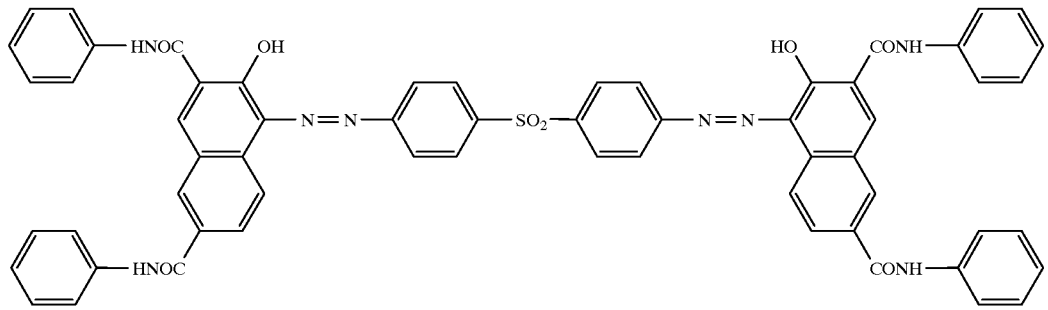

According to the same manner as described in Example 1 with the exception that 2.5 g of bis(4-aminophenyl) sulfone was substituted for 1,4-phenylenediamine in Example 1, 6.7 g of a dark bluish red powder [bis{4-(2'-hydroxy-3',6'-diphenylaminocarbonylnaphth-1'-ylazo)phenyl}sulfone] was obtained (melting/decomposition point: 298.5° C. (decomposition)).

EXAMPLE 10

Synthesis of 1, 4-bis{3', 6'-di(benzimidazolon-5"-ylaminocarbonyl)-2'-hydroxynaphth-1'-ylazo)benzene

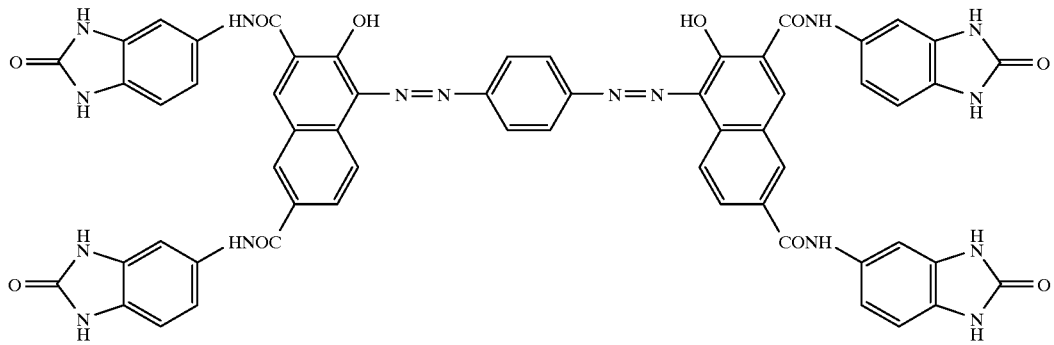

According to the same manner as described in Example 1 with the exception that 14.8 g of 3,6-di(benzimidazolon-5'-ylaminocarbonyl)-2-hydroxynaphthalene synthesized according to Japanese Patent Application No. 96-530874 was substituted for 2-hydroxy-3,6-diphenylaminocarbonylnaphthalene in Example 1, 7.9 g of a dark bluish purple powder [1,4-bis{3',6'-di(benzimidazolon-5"-ylaminocarbonyl)-2'-hydroxynaphth-1'-ylazo)-benzene] was obtained (melting/decomposition point: 284.1° C. (decomposition)).

Experiments

The bisazo compound obtained in Example 10 was used to evaluate its resistance to water, chemical agents, solvents, light, heat, and migration, and the results obtained are shown in Table 1.

TABLE 1

| Bisazo compound | Color | Water-resistance | Resistance to chemical agent/5% HCl | Solent-resistance acetone/methanol/xylene | | | Lightfastness | Thermostability | Resistance to migration |
|---|---|---|---|---|---|---|---|---|---|
| Bisazo compound of Example 10 | Dull reddish purple | A | A | A | A | A | A | A | A |

Method for Evaluation

Water-resistance

One g of the sample is added to 20 g of water, and dispersed by sonicating for 20 minutes. After boiling for one minutes, the mixture is cooled, filtered, and the filtrate is observed.

| | |
|---|---|
| No coloring is observed at all | A |
| Quite slightly colored | B |
| Slightly colored | C |
| Colored | D |
| Remarkably colored | E |

Resistance to solvents and chemical agents

One g of the sample is added to 20 g of a test liquid[(1)], and dispersed by sonicating for 5 minutes. After filtration, the filtrate is observed.

[(1)] Test liquid: acetone, methanol, xylene, 5% aqueous HCl.

| | |
|---|---|
| No coloring is observed at all | A |
| Quite slightly colored | B |
| Slightly colored | C |
| Colored | D |
| Remarkably colored | E |

Preparation of PVC-sheet for Evaluation

One part of the sample is added to 100 parts of a compound consisting of 100 parts of PVC, 50 parts of dioctyl phthalate, 2 parts of tin maleate, 0.4 parts of calcium stearate, and 0.6 parts of barium stearate, mixed for 5 minutes at 140° C. by means of a two-roll mixer, and then compressed at 100 kgf/cm$^2$ to obtain a 1 mm thick PVC test sheet.

Lightfastness

1) The above-described PVC test sheet for evaluation is cut into 35 mm×110 mm sheets.

2) A half of a test sheet of 1) is masked, and irradiated in a weather-ometer (K. K. SHIMADZU SEISAKUSHO; Suntester XF-180/xenon lamp) for 100 hours. Both of the masked and unmasked areas were colorimetrically measured, and the lightfastness was evaluated on the basis of its ΔE, the color difference between the two areas.

| | |
|---|---|
| ΔE < 2 | A |
| ΔE = 2–3 | B |
| ΔE = 3–5 | C |
| ΔE = 5–8 | D |
| ΔE > 8 | E |

Thermostability

1) The above-described PVC test sheet for evaluation is cut into 30 mm×30 mm sheets.

2) A test sheet of 1) is left in a thermostatic chamber at 170° C. for 60 minutes. The test sheet was then colorimetrically measured before and after the heat-treatment, and the thermostability was evaluated on the basis of the color difference, ΔE before and after the heat-treatment.

| | |
|---|---|
| ΔE < 2 | A |
| ΔE = 2–3 | B |
| ΔE = 3–5 | C |
| ΔE = 5–8 | D |
| ΔE > 8 | E |

Resistance to migration

1) The above-described PVC test sheet for evaluation is cut into 40 mm×50 mm sheets.

2) A hundred parts of the compound used in the above section and 5 parts of titanium white are processed as above, and cut into 40 mm×60 mm sheets.

3) The sheet of 2) is layered onto the sheet of 1) with a side of one sheet being matched with a side of another sheet, and loaded with weighted at 100 gf/cm$^2$.

4) 3) is left at 70° C. for 24 hours. The resistance to migration was evaluated on the basis of the degree to which the migration into the titanium white sheet has occurred.

| | |
|---|---|
| No transfer | A |
| Slightly transferred | B |
| Transferred | C |
| Considerably transferred | D |

EXAMPLE 11

Synthesis of 1, 4-bis{2'-hydroxy-3', 6'-di(2"-chlorophenylureidocarbonyl)naphth-1'-ylazo}benzene

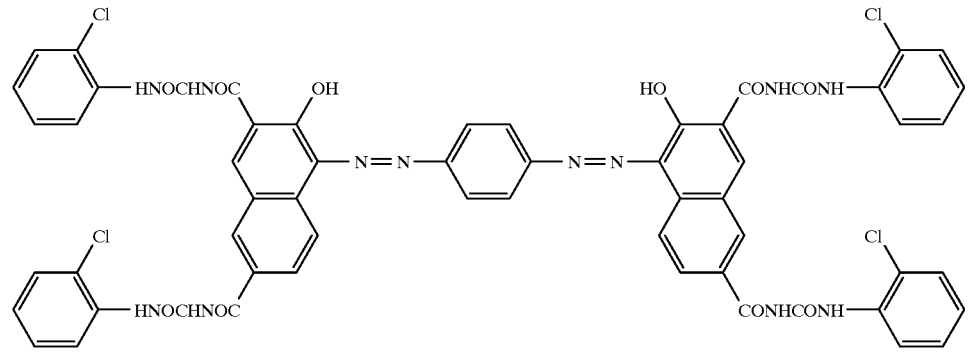

According to the same manner as described in Example 1 with the exception that 16.2 g of 2-hydroxy-3,6-di(2'-chlorophenylureidocarbonyl) naphthalene was substituted for 2-hydroxy-3,6-diphenylaminocarbonylnaphthalene in Example 1, 7.1 g of a dark bluish purple powder [1,4-bis{2'-hydroxy-3',6'-di(2"-chlorophenylureido-carbonyl)naphth-1'-ylazo}benzene] was obtained (melting/decomposition point: 220.3° C. (decomposition)).

EXAMPLE 12

Synthesis of 1, 4-bis{2'-hydroxy-3', 6'-di(2"-pyridylaminocarbonyl)naphth-1'-ylazo)-2-chlorobenzene

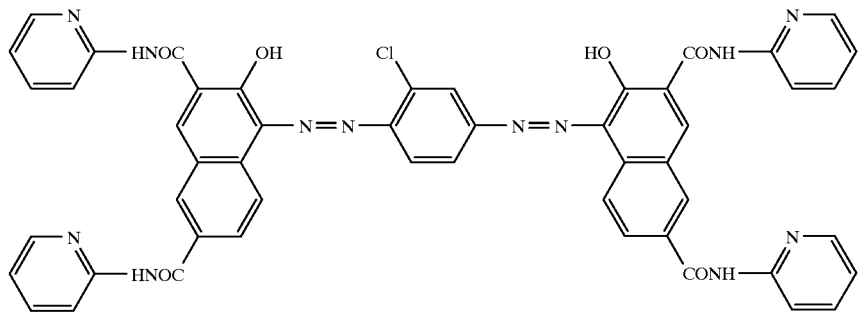

According to the same manner as described in Example 1 with the exceptions that 2.4 g of 2-chloro-1,4-phenylenediamine sulfate was substituted for 1,4-phenylenediamine in Example 1, and that 11.5 g of 2-hydroxy-3,6-di(2'-pyridylaminocarbonyl)naphthalene synthesized according to Japanese Patent Application No. 96-269985 was used, 4.7 g of a deep bluish purple powder [1,4-bis{2'-hydroxy-3',6'-di(2'-pyridylaminocarbonyl) naphth-1'-ylazo}-2-chlorobenzene] was obtained (melting/decomposition point: 266.4° C. (decomposition)).

EXAMPLE 13

Synthesis of 2, 7-bis(2'-hydroxy-3', 6'-diphenylaminocarbonylnaphth-1'-ylazo)-9-fluorenone

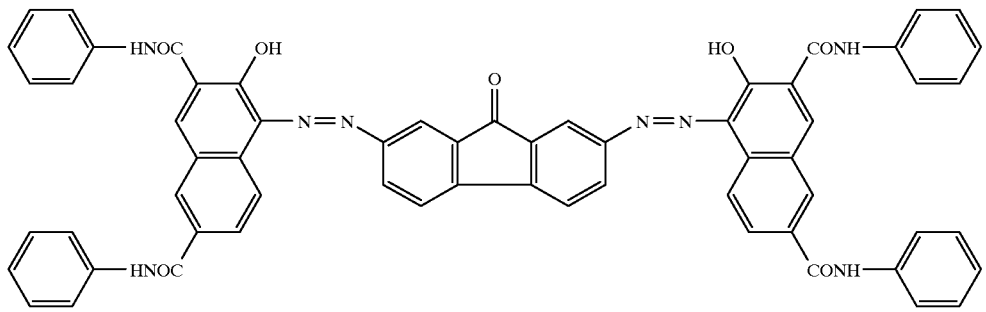

In 20 g of water, 1.23 g of 2,7-diamino-9-fluorenone was suspended, and dissolved by adding 1.5 g of 35% hydrochloric acid. Diazotization was then conducted by adding dropwise a solution of 0.73 g of sodium nitrite dissolved in 5 g of water, while maintaining the temperature at 0° C. Then, 4 g of 42% fluoroboric acid was added, and the bisdiazonium salt precipitated was filtered. On the other hand, 3.82 g of 2-hydroxy-3,6-bis(phenylaminocarbonyl) naphthalene was dissolved in 80 g of N-methyl-2-pyrrolidone, followed by adding 0.57 g of sodium methoxide, dissolved, and then maintained at 15° C. To this solution, a solution of the above tetrazolium salt dissolved in 20 g of N-methyl-2-pyrrolidone was added over about 20 minutes to conduct a coupling reaction. After stirring for additional one hour, 0.8 g of acetic acid was added, and then 150 g of methanol was slowly added. The product was isolated by filtration with aspirating, ultrasonically washed in water and methanol, and dried under a reduced pressure to obtain 3.4 g of a dark bluish purple powder [2,7-bis(2'-hydroxy-3',6'-diphenylaminocarbonylnaphth-1'-ylazo)-9-fluorenone] (melting/decomposition point: 333.6° C. (decomposition)).

EXAMPLE 13-2

Electrophotographic Property of 2,7-bis(2'-hydroxy-3',6'-diphenylaminocarbonylnaphth-1'-ylazo)-9-fluorenone One part of the azo compound obtained in Example 13 was dispersed with one part of a poly(vinyl butyral) (Sekisui Chemical Co., S-LEC BH-3) and 10 parts of cyclohexanone by means of a ball mill. This dispersed azo compound was applied onto an aluminum plate using a bar coater, and then dried. At this stage, the thickness of the film was about 0.5 μm. Onto the carrier generation layer so obtained, a solution consisting of one part of N-ethylcarbazole-3-aldehyde diphenylhydrazone and one part of a polycarbonate resin (TEIJIN Chemicals Co., Panlite K-1285) dissolved in 20 parts of 1,2-dichloroethane was applied so that, when dried, a 20 μm thick film would be obtained to form an carrier transport layer. In this way, an electrophotosensitive material consisting of two layers was obtained.

A half-exposure ($E_{1/2}$) as a sensitivity of a photosensitive material was measured for the above photosensitive material by means of an electrostatic copy paper tester (Kawaguchi Denki Seisakusho Model EPA-8100). The material was firstly electrified by corona discharge at −5.0 kV in a dark place, and then exposed to white light at an illumination of 20 luxes in order to determine the amount of exposure required to decrease the surface potential to the half of the initial value.

The half-exposure ($E_{1/2}$) so determined was 2.3 lux·sec. And the surface potential after sufficient exposure (residual potential) (after exposed to 200 lux·sec) was −1 V.

EXAMPLES 14–38

According to the same manner as described in Example 13 with the exceptions that as diamine components, amines shown below Table 2 were substituted for 2,7-diamino-9-fluorenone in Example 13, and that as coupler components, couplers shown below Table 2 were substituted for 2-hydroxy-3,6-bis(phenylaminocarbonyl)naphthalene, azo compounds were synthesized. Melting/decomposition points of the synthesized azo compounds are shown in Table 2.

Furthermore, photosensitive materials were prepared as in Example 13-2 with the exception that each of the azo compounds synthesized in Examples 17, 20, 22, 23, 28, 32 and 33 was used instead of the azo compound used in Example 13-2, and their sensitivities (half-exposure $E_{1/2}$) were determined. The determined $E_{1/2}$ and residual potentials are shown in Table 2.

TABLE 2

| Example No. | Structural formula of azo-compound | color | decomposition point | E½ (lux·sec)/ residual potential |
|---|---|---|---|---|
| 14 | (azo compound with phenyl CONH groups) | reddish purple | 337.1° C. | |
| 15 | (azo compound with 3-nitrophenyl CONH groups) | reddish purple | 339.8° C. | |

TABLE 2-continued
| Example No. | Structural formula of azo-compound | color | decomposition point | $E_{1/2}$ (lux · sec)/ residual potential |
|---|---|---|---|---|
| 16 | 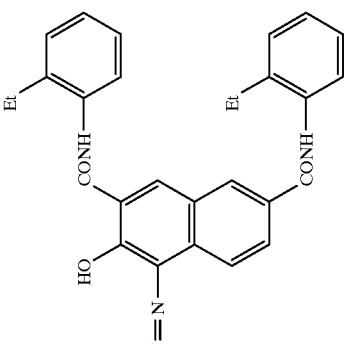 | reddish purple | 310.8° C. | |
| 17 | 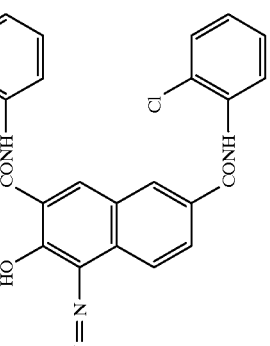 | reddish purple | 337.1° C. | 2.8/−2 V |

TABLE 2-continued

| Example No. | Structural formula of azo-compound | color | decomposition point | E½ (lux·sec)/ residual potential |
|---|---|---|---|---|
| 18 | (structure) | purple | 323.1° C. | |
| 19 | (structure) | opaque bluish purple | 409.0° C. | |

TABLE 2-continued

| Example No. | Structural formula of azo-compound | color | decomposition point | $E_{1/2}$ (lux · sec)/ residual potential |
|---|---|---|---|---|
| 20 | (bis-azo compound with 2-ethylphenyl CONH groups) | dark bluish purple | 322.8° C. | 2.7/−1 V |
| 21 | (bis-azo compound with 2-chlorophenyl CONH groups) | purple | 321.5° C. | |

TABLE 2-continued

| Example No. | Structural formula of azo-compound | color | decomposition point | E½ (lux·sec)/ residual potential |
|---|---|---|---|---|
| 22 | (structure) | dark reddish purple | 231.3° C. | 2.6/−1 V |
| 23 | (structure) | bluish purple | 277.6° C. | 2.8/−2 V |

TABLE 2-continued

| Example No. | Structural formula of azo-compound | color | decomposition point | E½ (lux·sec)/ residual potential |
|---|---|---|---|---|
| 24 | [bis-azo compound with 3-nitrophenyl CONH groups on both naphthol ends, linked via phenyl-benzoxazole-phenyl bridge] | reddish purple | 271.1° C. | |
| 25 | [bis-azo compound with 2-ethylphenyl CONH groups on both naphthol ends, linked via phenyl-benzoxazole-phenyl bridge] | opaque reddish purple | 290.9° C. | |

TABLE 2-continued
| Example No. | Structural formula of azo-compound | color | decomposition point | E½ (lux·sec)/ residual potential |
|---|---|---|---|---|
| 26 | 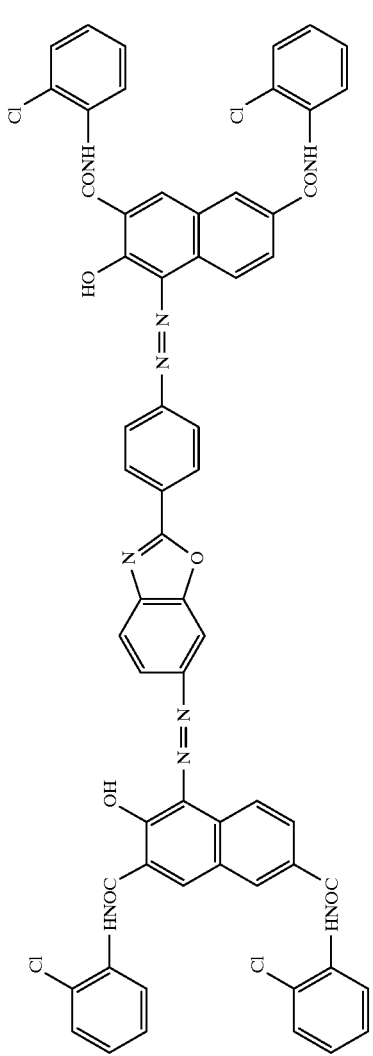 | purplish red | 291.8° C. | |
| 27 | 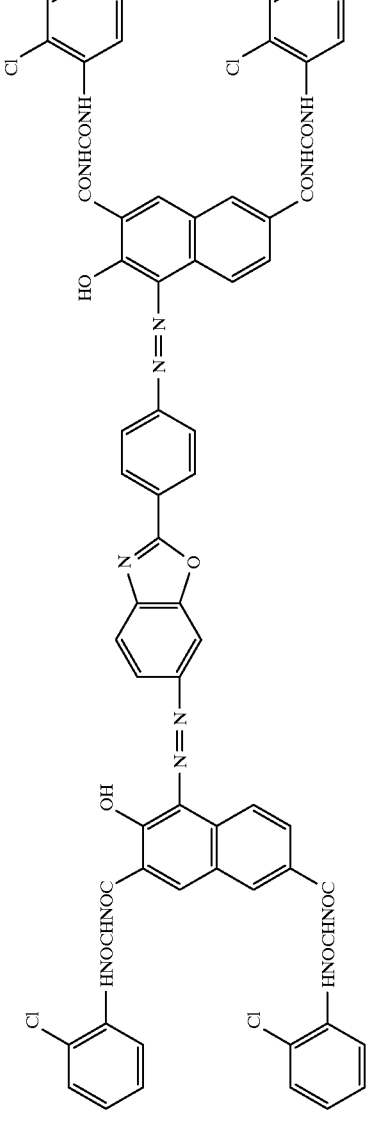 | dark reddish purple | 231.3° C. | |

TABLE 2-continued
| Example No. | Structural formula of azo-compound | color | decomposition point | $E_{1/2}$ (lux·sec)/ residual potential |
|---|---|---|---|---|
| 28 | 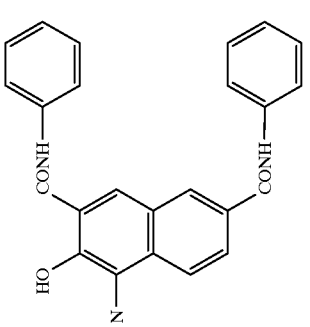 | dark reddish purple | 231.3° C. | 1.9/−2 V |
| 29 | 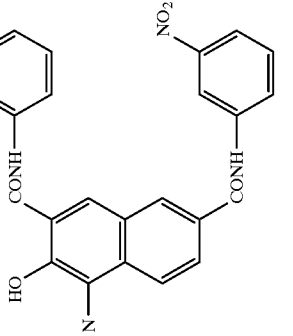 | dark reddish purple | 282.0° C. | |

TABLE 2-continued

| Example No. | Structural formula of azo-compound | color | decomposition point | E½ (lux·sec)/ residual potential |
|---|---|---|---|---|
| 30 | (bis-azo compound with central benzotriazole, coupled to 2-hydroxy-3,6-bis(N-(2-ethylphenyl)carbamoyl)naphthalene units) | dark purple | 287.3° C. | |
| 31 | (bis-azo compound with central 4,4'-(α-cyanostilbene) linker, coupled to 2-hydroxy-3,6-bis(N-phenylcarbamoyl)naphthalene units) | reddish purple | 304.5° C. | |

TABLE 2-continued

| Example No. | Structural formula of azo-compound | color | decomposition point | E½ (lux·sec)/ residual potential |
|---|---|---|---|---|
| 32 | Bis-azo compound with 2-hydroxy-3,6-bis(3-nitrophenylcarbamoyl)naphthalene coupler groups linked via –N=N–C₆H₄–CH=C(CN)–C₆H₄–N=N– | reddish purple | 292.5° C. | 2.1/−2 V |
| 33 | Bis-azo compound with 2-hydroxy-3,6-bis(phenylcarbamoyl)naphthalene coupler groups linked via –N=N–C₆H₄–C₆H₄–N=N– (biphenyl) | dark purple | 309.8° C. | 2.0/−2 V |

TABLE 2-continued

| Example No. | Structural formula of azo-compound | color | decomposition point | E½ (lux·sec)/ residual potential |
|---|---|---|---|---|
| 34 | (bis-azo naphthalene compound with two 3-nitrophenyl-CONH groups, linked via −N=N−C6H4−C6H4−N=N−) | dark purple | 297.7° C. | |
| 35 | (bis-azo naphthalene compound with two 3-nitrophenyl-CONH groups, linked via −N=N−C6H4−S−C6H4−N=N−) | reddish purple | 287.0° C. | |

TABLE 2-continued
| Example No. | Structural formula of azo-compound | color | decomposition point | E½ (lux·sec)/ residual potential |
|---|---|---|---|---|
| 36 |  | purplish red | 301.5° C. | |
| 37 |  | purplish red | 297.0° C. | |

TABLE 2-continued
| Example No. | Structural formula of azo-compound | color | decomposition point | $E_{1/2}$ (lux·sec)/ residual potential |
|---|---|---|---|---|
| 38 | 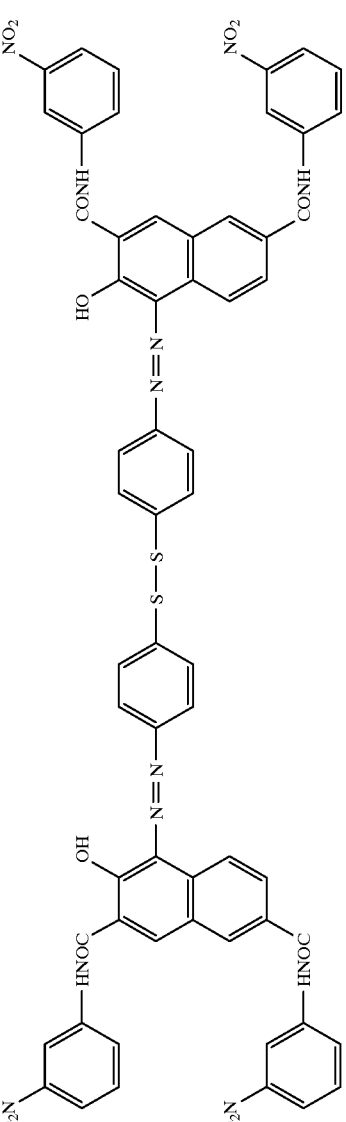 | reddish purple | 310.7° C. | |

Materials Used (amine/coupler)

Example 14: 2,5-di(4'-aminophenyl)-3,4-oxadiazole/2-hydroxy-3,6-bisphenylaminocarbonylnaphthalene Example 15: 2,5-di(4'-aminophenyl)-3,4-oxadiazole/2-hydroxy-3,6-bis(3'-nitrophenylaminocarbonyl)naphthalene Example 16: 2,5-di(4'-aminophenyl)-3,4-oxadiazole/2-hydroxy-3,6-bis(2'-ethylphenylaminocarbonyl)naphthalene Example 17: 2,5-di(4'-aminophenyl)-3,4-oxadiazole/2-hydroxy-3,6-bis(2'-chlorophenylaminocarbonyl)naphthalene Example 18: 2,5-di(4'-aminophenyl)-3,4-oxadiazole/2-hydroxy-3,6-bis(2'-chlorophenylureidocarbonyl)naphthalene Example 19: 2,7-diamino-9-fluorenone/2-hydroxy-3,6-bis(2'-nitrophenylaminocarbonyl)naphthalene Example 20: 2,7-diamino-9-fluorenone/2-hydroxy-3,6-bis(2'-ethylphenylaminocarbonyl)naphthalene Example 21: 2,7-diamino-9-fluorenone/2-hydroxy-3,6-bis(2'-chlorophenylaminocarbonyl)naphthalene Example 22: 2,7-diamino-9-fluorenone/2-hydroxy-3,6-bis(2'-chlorophenylureidocarbonyl)naphthalene Example 23: 2-(4'-aminophenyl)-6-aminobenz-1,3-oxazole/2-hydroxy-3,6-bisphenylaminocarbonylnaphthalene Example 24: 2-(4'-aminophenyl)-6-aminobenz-1,3-oxazole/2-hydroxy-3,6-bis(3'-nitrophenylaminocarbonyl)naphthalene Example 25: 2-(4'-aminophenyl)-6-aminobenz-1,3-oxazole/2-hydroxy-3,6-bis(2'-ethylphenylaminocarbonyl)naphthalene Example 26: 2-(4'-aminophenyl)-6-aminobenz-1,3-oxazole/2-hydroxy-3,6-bis(2'-chlorophenylaminocarbonyl)naphthalene Example 27: 2-(4'-aminophenyl)-6-amninobenz-1,3-oxazole/2-hydroxy-3,6-bis(2'-chlorophenylureidocarbonyl)naphthalene Example 28: 2-(4'-aminophenyl)-6-aminobenz-1,2,3-triazole/2-hydroxy-3,6-bisphenylaminocarbonylnaphthalene Example 29: 2-(4'-aminophenyl)-6-aminobenz-1,2,3-triazole/2-hydroxy-3,6-bis(3'-nitrophenylaminocarbonyl)naphthalene Example 30: 2-(4'-aminophenyl)-6-aminobenz-1,2,3-triazole/2-hydroxy-3,6-bis(2'-ethylphenylaminocarbonyl)naphthalene Example 31: 4,4'-diamino-α-cyanostilbene/2-hydroxy-3,6-bisphenylaminocarbonylnaphthalene Example 32: 4,4'-diamino-α-cyanostilbene/2-hydroxy3,6-bis(3'-nitrophenylaminocarbonyl)naphthalene Example 33: 4,4'-diaminoazobenzene/2-hydroxy-3,6-bisphenylaminocarbonylnaphthalene Example 34: 4,4'-diaminoazobenzene/2-hydroxy-3,6-bis(3'-nitrophenylaminocarbonyl)naphthalene Example 35: 4,4'-diaminodiphenyl sulfide/2-hydroxy-3,6-bis(3'-nitrophenylaminocarbonyl)naphthalene Example 36: 4,4'-diaminodiphenyl sulfide/2-hydroxy-3,6-bis(2'-chlorophenylaminocarbonyl)naphthalene Example 37: 4,4'-diaminodiphenyl disulfide/2-hydroxy-3,6-bisphenylaminocarbonylnaphthalene Example 38: 4,4'-diaminodiphenyl disulfide/2-hydroxy-3,6-bis(3'-nitrophenylaminocarbonyl)naphthalene

EXAMPLE 39

Synthesis of calcium salt of 1,4-bis(2'-hydroxy-3',6'-dihydroxycarbonylnaphth-1'-ylazo)-benzene

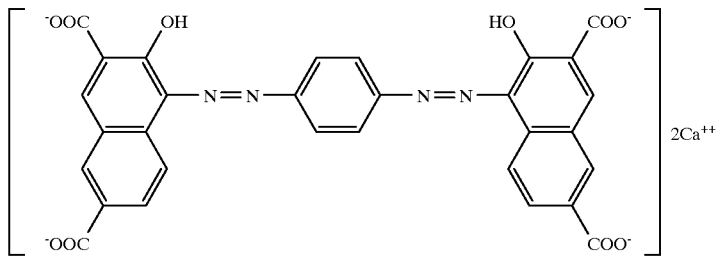

In 30 g of water, 1.1 g of p-phenylenediamine was dispersed, and dissolved by adding 5.2 g of 35% hydrochloric acid. Diazotization is then conducted by adding dropwise a solution of 1.7 g of sodium nitrite dissolved in 10 g of water, while maintaining the temperature at 0° C. On the other hand, 4.6 g of 2-hydroxy-3,6-dihydroxycarbonylnaphthalene was suspended in 10 g of water, dissolved by adding 28.0 g of 10% aqueous sodium hydroxide and 13.5 g of 5% rosin solution, and then maintained at 13(±2)° C. To this solution, the above diazo solution was added dropwise over about 30 minutes, and farther stirred for 90 minutes. After adjusting the pH of the reaction mixture to 9.0–9.5, a solution of 4.4 g of calcium chloride dihydrate dissolved in 40 g of water was added dropwise in order to form a lake. After one hour, the mixture was brought to 70° C., left for about 30 minutes, and then cooled gradually to room temperature. To this, 200 g of water was added, and filtered with aspirating. The product was washed with water, and dried to give 1.94 g of a dark bluish purple powder [calcium salt of 1,4-bis(2'-hydroxy-3', 6'-dihydroxycarbonylnaphth-1'-ylazo)benzene] (melting/decomposition point: 412.1° C. (decomposition)).

An IR spectrum of this compound (KBr method) is shown in FIG. 4.

EXAMPLES 40–44

According to the same manner as descsibed in Example 39 with the exceptions that as diamine components, amines shown below Table 3 were substituted for p-phenylenediamine in Example 39, that as coupler components, couplers shown below Table 3 were substituted for 2-hydroxy-3,6-dihydroxycarbonylnaphthalene, and that 1.1–1.2 equivalents of calcium chloride dihydrate was used, azo compounds were synthesized. Melting/decomposition points of the synthesized azo compounds are shown in Table 3.

TABLE 3

| Example No. | Structural formula of azo-compound | color | decomposition point |
|---|---|---|---|
| 40 | [structure: bis(1-((4-chloro-2-...phenyl)azo)-2-hydroxy-3,6-naphthalenedicarboxylate), 2 Ca²⁺] | dark bluish purple | 328.8° C. |
| 41 | [structure: bis(1-((4-sulfo-...phenyl)azo)-2-hydroxy-3,6-naphthalenedicarboxylate), 5/2 Ca²⁺] | dark bluish purple | 296.8° C. |
| 42 | [structure: bis(1-((naphthyl)azo)-2-hydroxy-3,6-naphthalenedicarboxylate), 2 Ca²⁺] | dark bluish purple | 304.6° C. |

TABLE 3-continued

| Example No. | Structural formula of azo-compound | color | decomposition point |
|---|---|---|---|
| 43 | Calcium salt of bis-azo compound: 1-[(4-{[1-hydroxy-3-carboxylato-6-(phenylcarbamoyl)naphthalen-4-yl]azo}phenyl)azo]-2-hydroxy-3-carboxylato-6-(phenylcarbamoyl)naphthalene, Ca²⁺ | dark bluish purple | 338.3° C. |
| 44 | Calcium salt of bis-azo compound: 1-[(4-{[1-hydroxy-3-carboxylato-6-((5-chloro-2,4-dimethoxyphenyl)carbamoyl)naphthalen-4-yl]azo}phenyl)azo]-2-hydroxy-3-carboxylato-6-((5-chloro-2,4-dimethoxyphenyl)carbamoyl)naphthalene, Ca²⁺ | dark bluish purple | 290.1° C. |

Materials Used (amine/coupler)

Example 40: 2-chloro-1,4-phenylenediamine/2-hydroxy-3,6-bishydroxycarbonylnaphthalene Example 41: 1,5-phenylenediamine-2-sulfonic acid/2-hydroxy-3,6-bishydroxycarbonylnaphthalene Example 42: 1,5-naphthylenediamine/2-hydroxy-3,6-bishydroxycarbonylnaphthalene Example 43: 1,4-phenylenediamine/2-hydroxy-3-hydroxycarbonyl-6-phenylaminocarbonylnaphthalene Example 44: 1,4-phenylenediamine/2-hydroxy-3-hydroxycarbonyl-6-(5'-chloro-2,4'-dimethoxyphenyl)aminocarbonylnaphthalene Experiments For Examples 40, 41 and 43, printing inks were prepared according to JIS K5101, and extended. The obtained color data is shown in Table 4. As color data, the dominant wavelength $\lambda d$, the excitation purity Pe, and the brightness Y as described in JIS Z8701 are shown.

TABLE 4

| | Dominant wavelength $\lambda d$ | Excitation purity Pe | Brightness Y |
|---|---|---|---|
| Example 40 | 652 nm | 12.5% | 6.6% |
| Example 41 | 614 nm | 13.9% | 4.8% |
| Example 43 | 700 nm | 10.1% | 5.5% |

EXAMPLES 45–50

According to the same manner as described in Example 13 with the exceptions that as diamine components, diamines shown below Table 5 were substituted for 2,7-diamino-9-fluorenone, and that as coupler components, couplers shown below Table 5 were substituted for 2-hydroxy-3,6-bis(phenylaminocarbonyl)naphthalene, azo compounds were synthesized. Melting/decomposition point of the synthesized azo compounds are shown in Table 5.

TABLE 5

| Example No. | Structural formula of azo-compound | color | Decomposition point |
|---|---|---|---|
| 45 | (azo compound structure) | dark reddish purple | 305.2° C. |
| 46 | (azo compound structure) | dark reddish purple | 286.3° C. |
| 47 | (azo compound structure) | dark reddish purple | 267.1° C. |

TABLE 5-continued

| Example No. | Structural formula of azo-compound | color | Decomposition point |
|---|---|---|---|
| 48 | (structure) | dark bluish purple | 304.6° C. |
| 49 | (structure) | dark bluish purple | 349.7° C. |
| 50 | (structure) | dark reddish purple | 359.5° C. |

Materials Used (amine/coupler)

Example 45: p-phenylenediamine/2-hydroxy-3-methoxycarbonyl-6-(3'-nitrophenyl)aminocarbonylnaphthalene Example 46: p-phenylenediamine/2-hydroxy-3-methoxycarbonyl-6-benzyloxycarbonylnaphthalene Example 47: p-phenylenediamine/2-hydroxy-3,6-bis(phenoxycarbonyl)naphthalene Example 48: p-phenylenediamine/2-hydroxy-3,6-bis(benzothiazol-2'-ylaminocarbonyl)naphthalene Example 49: 2-nitro-1,4-phenylenediamine/2-hydroxy-3,6-bis(4',5'-dicyanoimidazol-2'-ylaminocarbonyl)naphthalene Example 50: p-phenylenediamine/2-methoxy-3-(benzimidazolon-5'-ylaminocarbonyl)-6-phenylaminocarbonylnaphthalene

INDUSTRIAL APPLICABILITY

The bisazo compounds of the invention are novel and are expected as pigments having excellent resistance to water, chemical agents, solvents, heat and the like.

Figure 1:
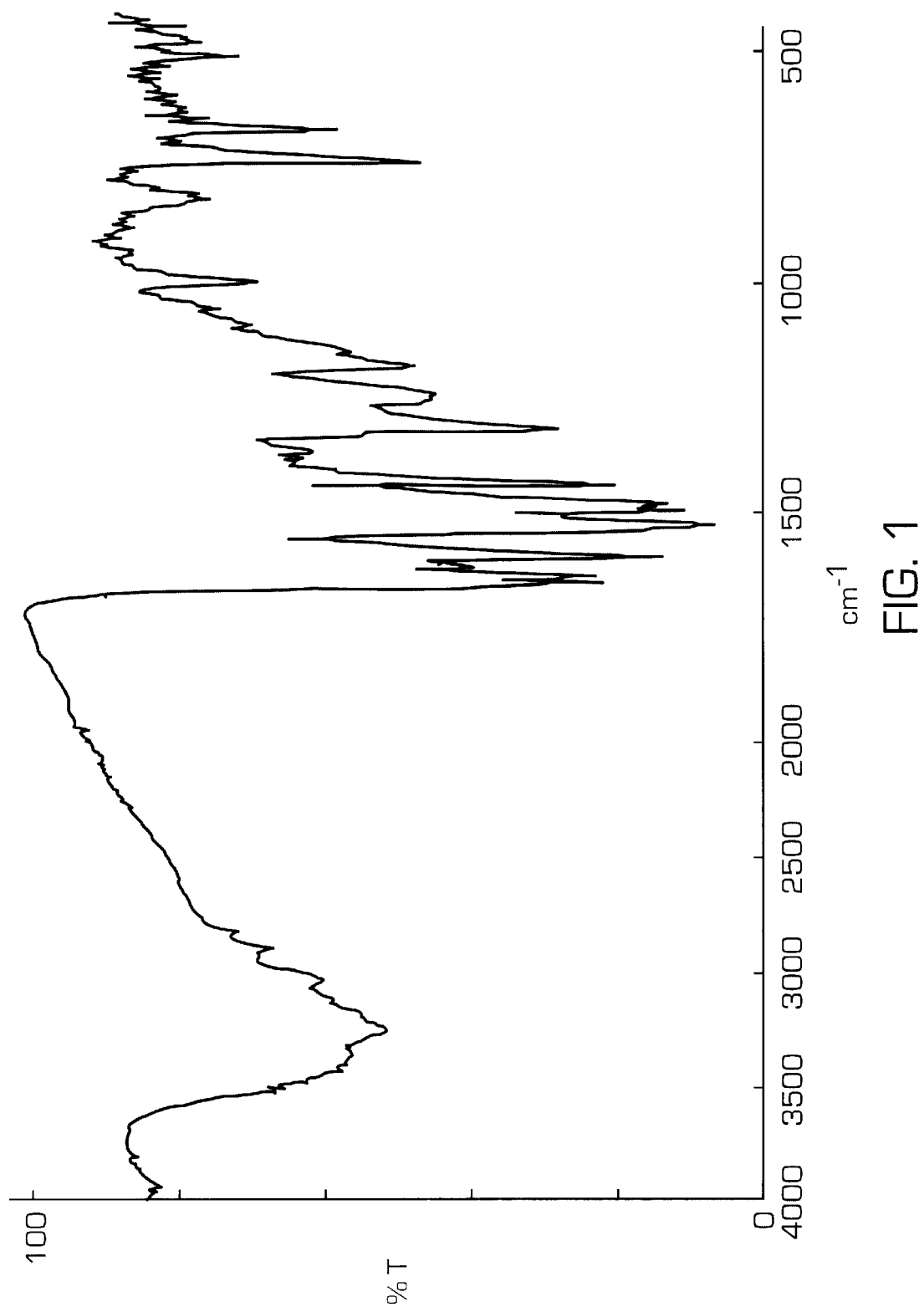
FIG. 1 is an IR spectrum of the bisazo compound obtained in Example 1.
Figure 2:
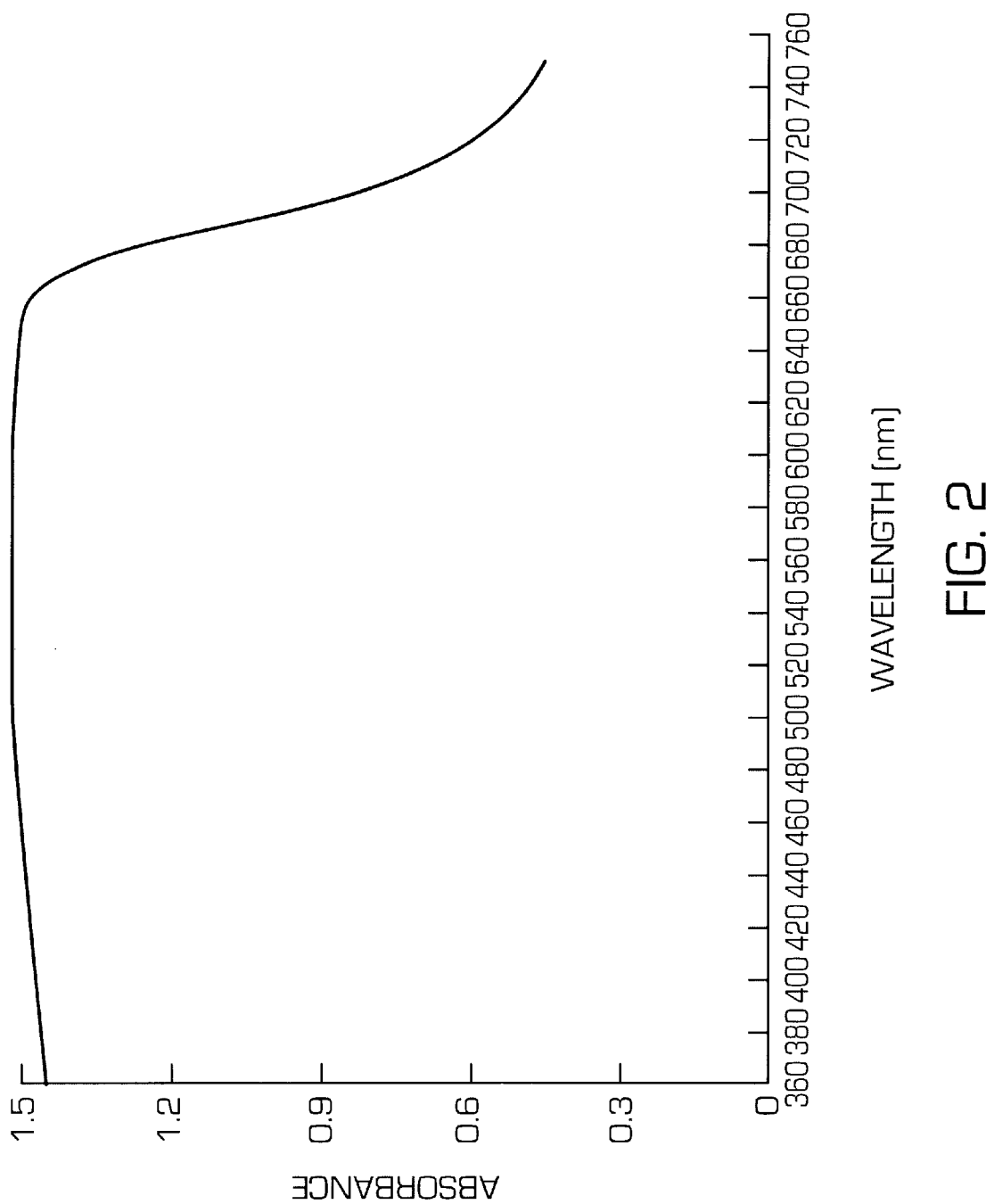
FIG. 2 shows a spectral property of the bisazo compound obtained in Example 5.
Figure 3:
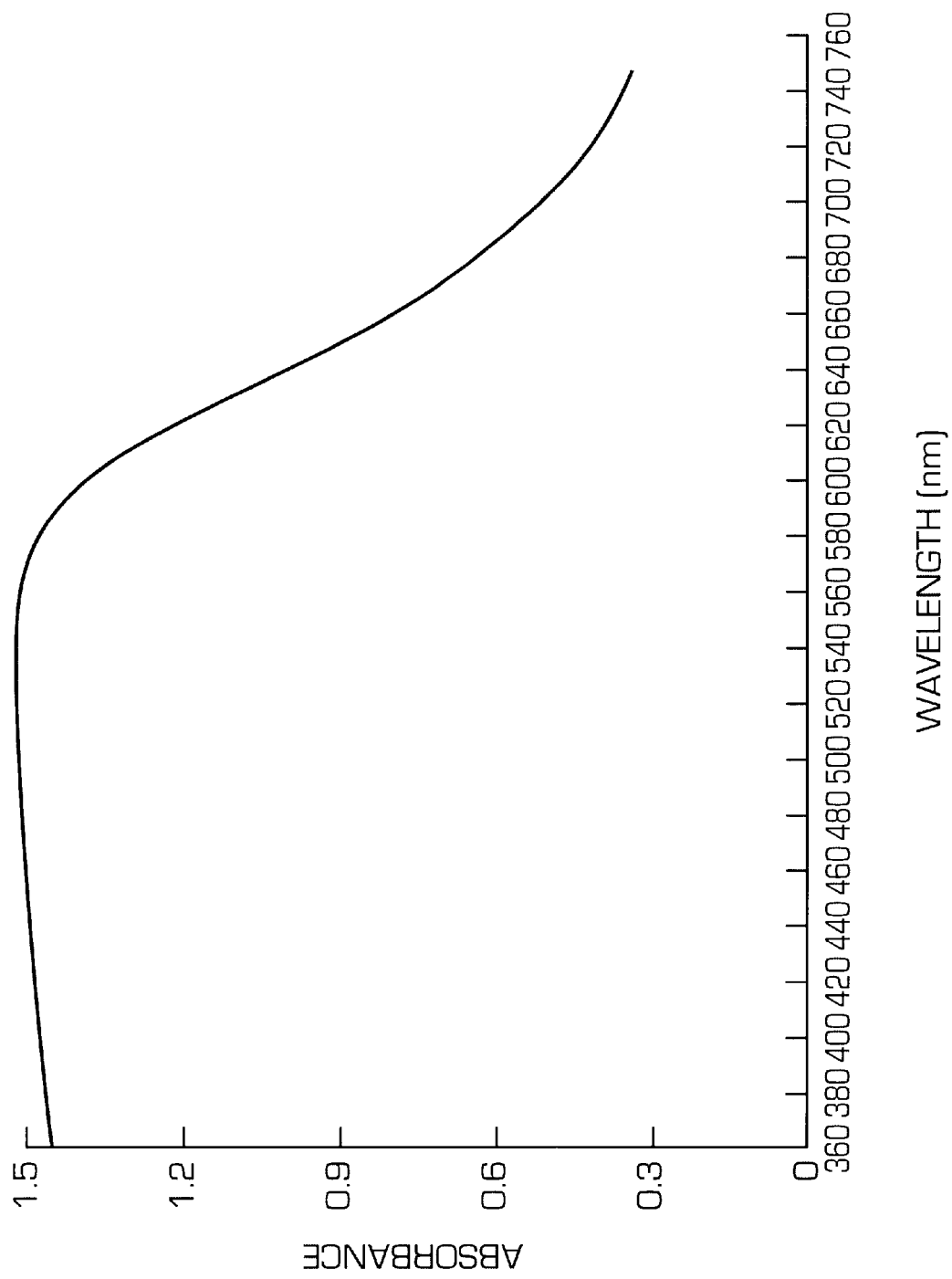
FIG. 3 shows a spectral property of the bisazo compound obtained in Example 7.
Figure 4:
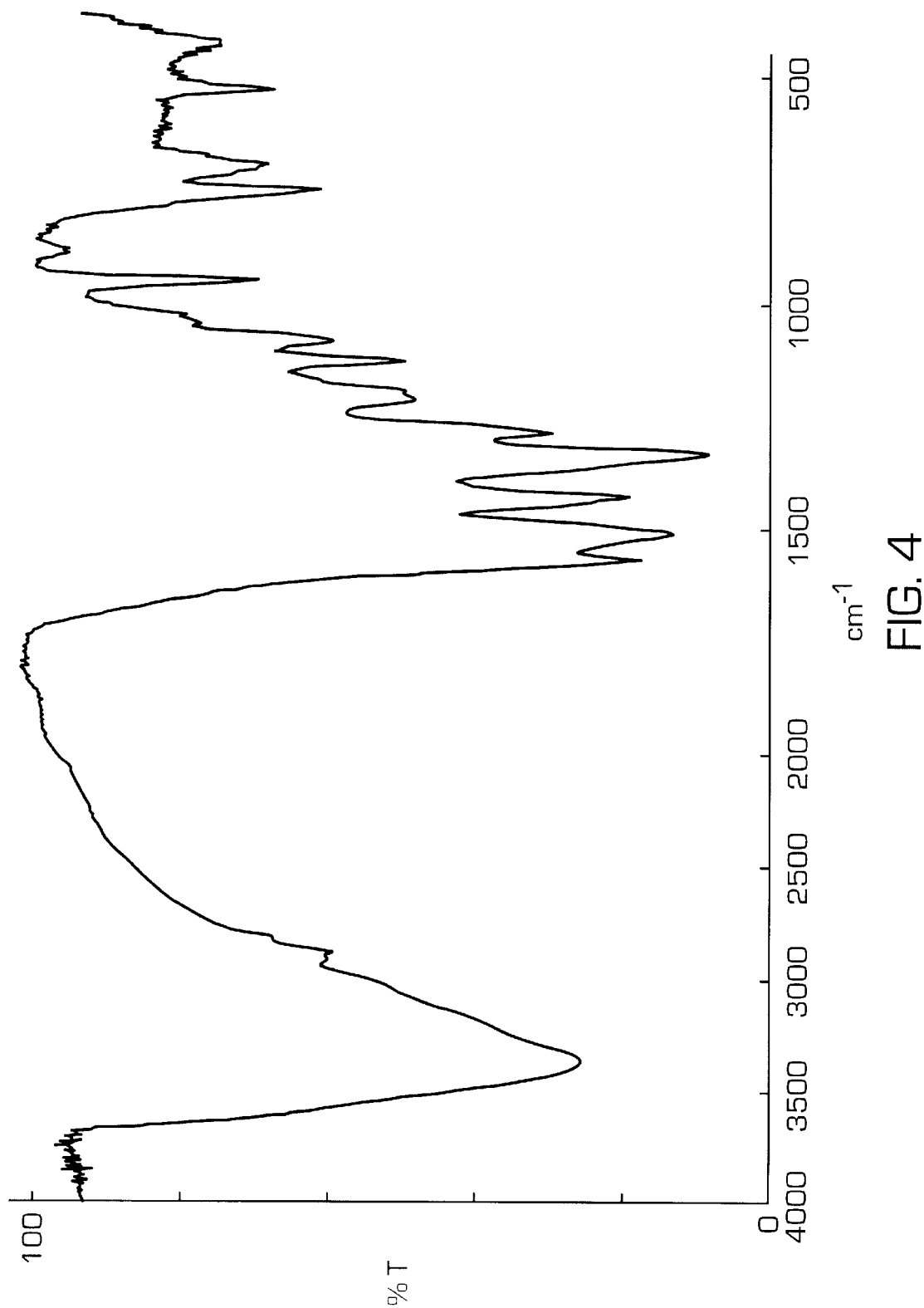
FIG. 4 is an IR spectrum of the bisazo compound obtained in Example 39.

We claim:

1. A bisazo compound represented by the following general formula I:

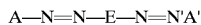

wherein,

A and A' may be the same or different, and represent the following general formula II:

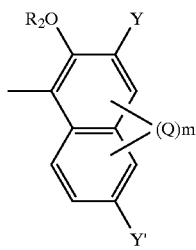

(wherein,

Y is —(CONH)n—X or —COR,

Y' is —(CONH)n—X' or —COR', and

X and X' may be the same or different, and represent an optionally substituted aromatic group or an optionally substituted heterocyclic group having a conjugated double bond), n represents an integer of 1 or 2, R and R' may be the same or different, and represent a hydroxy group, an optionally branched alkoxy group having 1–6 carbon atoms, a benzyloxy group, a phenoxy group, or a phenacyloxy group, $R_2$ represents a hydrogen atom, an optionally branched alkyl group having 1–6 carbon atoms, an acyl group having 1–6 carbon atoms or a phenylalkyl group;

Q represents an optionally branched alkyl group having 1–6 carbon atoms, an optionally branched alkoxy group having 1–6 carbon atoms, a halogen atom, a nitro group or a nitroso group, and m represents an integer from 0 to 3, and when one of R and R' represents a hydroxy group, it may optionally form an acceptable salt;

E represents a cyclic group having a conjugated double bond.

2. The bisazo compound according to claim 1 in which Y is —(CONH)n—X and Y' is —(CONH)n—X' in which X, X' and n are as defined above.

3. The bisazo compound according to claim 1 in which E is a group selected from a group consisting of arylene groups, the general formulas III and V:

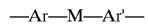

[wherein, Ar and Ar' each independently represent an optionally substituted aryl or heterocyclic group having a conjugated double bond, M represents a group selected from a group consisting of a single bond, —CH$_2$—, —CH═C(E')— (in which E' is a hydrogen, a halogen atom, a lower alkyl group, or a cyano group), —O—, —S—, —S—S—, —CO—, —COO—, —SO$_2$—, —N(T)— (in which T is an optionally substituted phenyl or a lower alkyl group), —N═N—, —CH═CH—φ—CH═CH— (in which φ is an arylene group), and a formula IV:

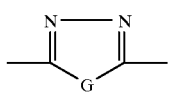

(in which G represents —O—, —S—, or —NH—);

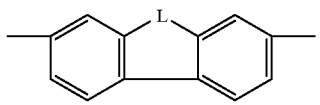

wherein, L represents >N—CH$_3$, >C═O, or >C═S.

4. A pigment comprising the bisazo compound set forth in claim 1.

5. A printing ink comprising the bisazo compound set forth in claim 1.

6. A paint comprising the bisazo compound set forth in claim 1.

7. A colorating agent for plastics comprising the bisazo compound set forth in claim 1.

8. An organic photoconductor comprising the bisazo compound set forth in claim 1.

9. A process for producing the bisazo compound set forth in claim 1 which comprises diazonating a compound represented by the general formula VI:

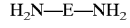

wherein, E represents a cyclic group having a conjugated double bond], and coupling the obtained bisdiazonium compound with a compound represented by the general formula VII:

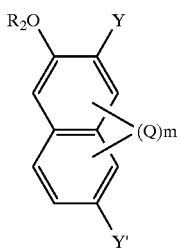

wherein,
Y is —(CONH)n—X or —COR,
Y' is —(CONH)n—X' or —COR',
X and X' may be the same or different, and represent an optionally substituted aromatic group or an optionally substituted heterocyclic group having a conjugated double bond, n represents an integer of 1 or 2, R and R' may be the same or different, and represent a hydroxy group, an optionally branched alkoxy group having 1–6 carbon atoms, a benzyloxy group, a phenoxy group, or a phenacyloxy group, $R_2$ represents a hydrogen atom, an optionally branched alkyl group having 1–6 carbon atoms, an acyl group having 1–6 carbon atoms or a phenylalkyl group;

Q represents an optionally branched alkyl group having 1–6 carbon atoms, an optionally branched alkoxy group having 1–6 carbon atoms, a halogen atom, a nitro group or a nitroso group, and m represents an integer from 0 to 3, and optionally, when R or R' is a hydroxy group, it may further be formed a lake.

* * * * *